CONSTANT FREQUENCY SOURCE

Filed Sept. 16, 1958 5 Sheets-Sheet 1

INVENTORS E. P. FELCH
R. A. SYKES

BY Walter M. Hill
ATTORNEY

INVENTORS E. P. FELCH
R. A. SYKES
BY Walter M. Hill
ATTORNEY

INVENTORS E. P. FELCH
R. A. SYKES
BY
Walter M. Hill
ATTORNEY

INVENTORS E. P. FELCH
R. A. SYKES
BY
Walter M. Hill
ATTORNEY

INVENTORS E. P. FELCH
R. A. SYKES
BY
Walter M. Hill
ATTORNEY

2,959,742

CONSTANT FREQUENCY SOURCE

Edwin P. Felch, Chatham, and Roger A. Sykes, Whippany, N.J., assignors to Bell Telephone Laboratories, Incorporated, New York, N.Y., a corporation of New York Filed Sept. 16, 1958, Ser. No. 761,349

11 Claims. (Cl. 331—14)

This invention relates to constant frequency sources and more particularly to a circuit means for extending the stability of an oscillator over a period substantially greater than its inherent short stability time.

Considerable attention has been given to the art of producing constant frequencies and investigations have shown that good short time stabilities may be obtained by most any well constructed oscillator. However, the problem of producing oscillators having long time stability had not been satisfactorily solved in any simple manner. Investigations have led to the conclusion that a primary cause of long time instability is the aging of the crystals or other electromechanical vibrating means which are used for control purposes. These investigations have also disclosed that crystals operating at room temperatures and extending down to very low temperatures and at low oscillating levels have considerably better aging properties than those operating at the normal control temperatures of 75 to 85 degrees centigrade. For example, for crystals operating at temperatures in the vicinity of 40 degrees centigrade the measured aging has been approximately one part in ten billion per month. At the temperature of liquid nitrogen the aging is considerably less while at the temperature of liquid helium the aging is not detectable. In order to achieve this degree of stability, the circuitry associated with the crystal must have a minimum influence on the crystal and must not drive it any more than is necessary to maintain oscillation. It has been discovered that if these crystals are not continuously driven their aging properties are improved.

It is an object of this invention to control the frequency of an oscillator from a vibrating electromechanical means having an inherent long time stability with means which has a minimum influence upon its free oscillating frequency and which provides no more driving energy to this vibrating means than is necessary to sustain oscillations.

The foregoing object is achieved by this invention which comprises a constant frequency electromechanical vibrating means capable of sustaining free oscillation with inherent long time frequency stability. This means is driven intermittently for relatively short periods by the oscillator to be controlled by the vibrating means, which oscillator itself possesses a reasonably good short time stability. A discriminator produces an output proportionate to the phase difference between the outputs of the oscillator and the vibrating means. During the coasting period the phase detector output is used to control a servo system which corrects the oscillator frequency to thereby effectively maintain a greatly improved long time stability.

The invention may be better understood by referring to the accompanying drawings, in which:

Fig. 1 is a block diagram showing the organization of the essential parts of the invention;

Fig. 2 discloses a modification of the switching means of Fig. 1;

Figure 5:
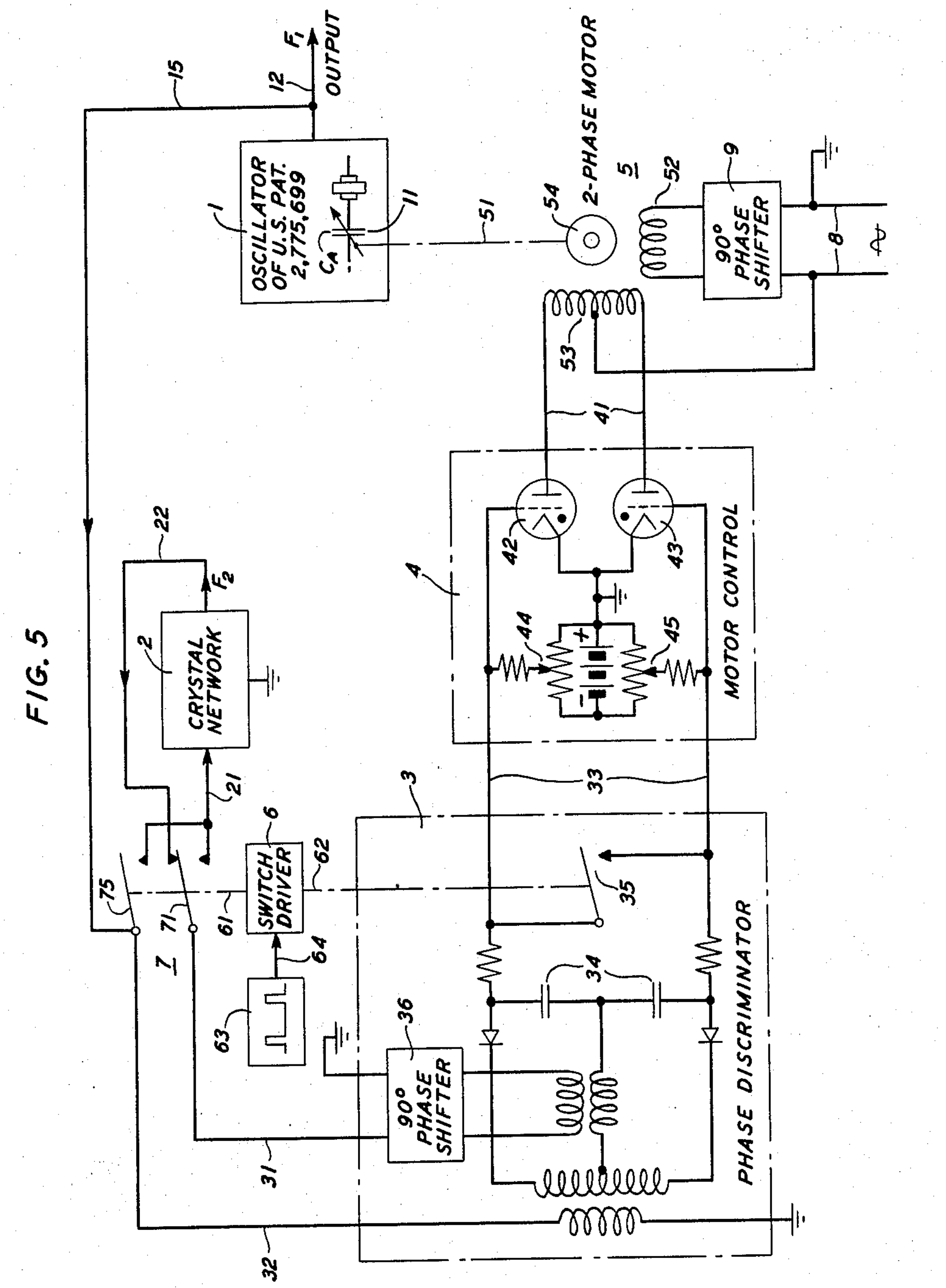
Fig. 5 is a partial schematic and partial block diagram showing in greater detail a particular embodiment.
Figure 5A:
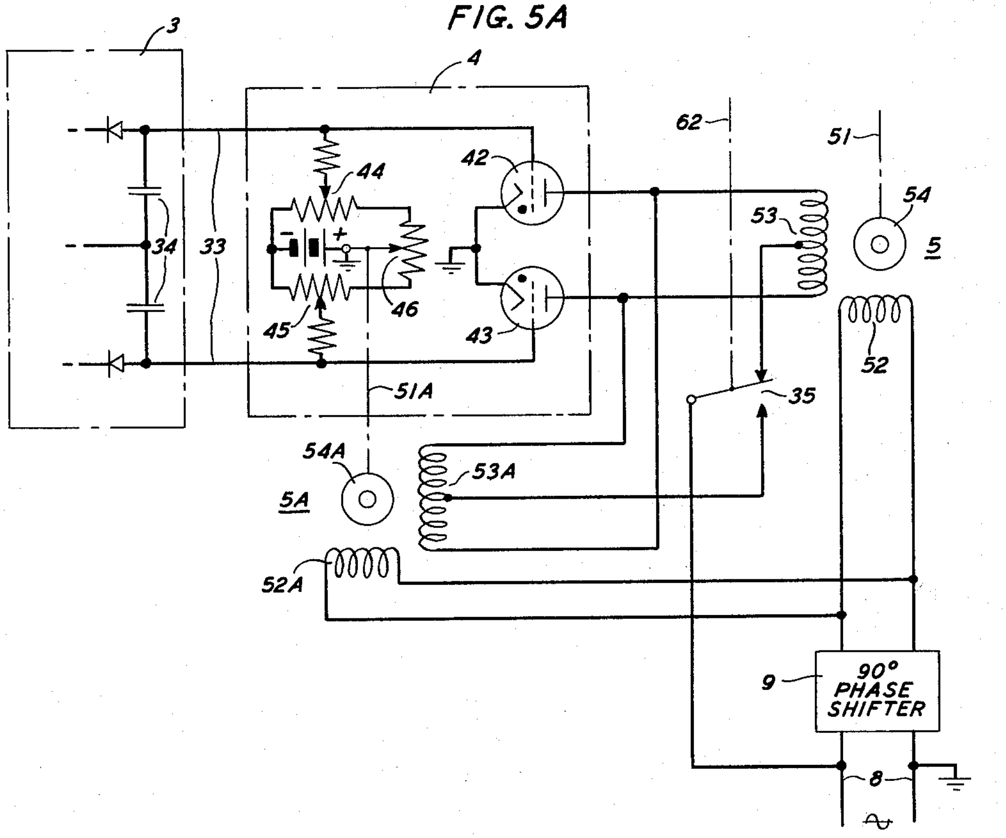
Figure 6:
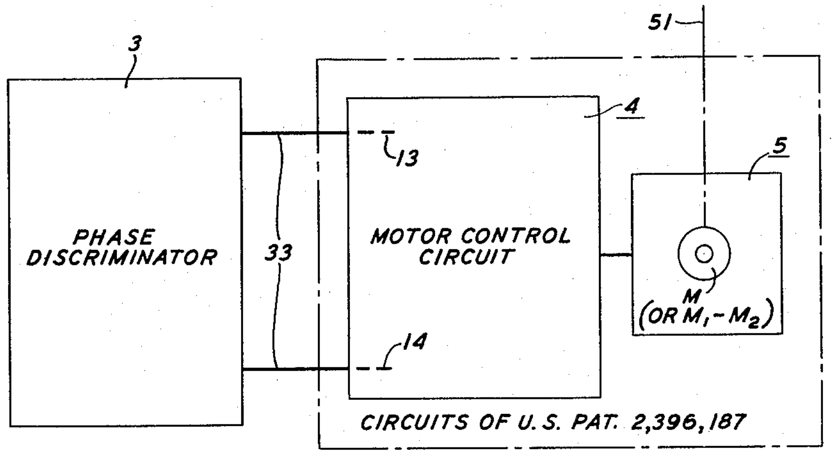
Figure 7:
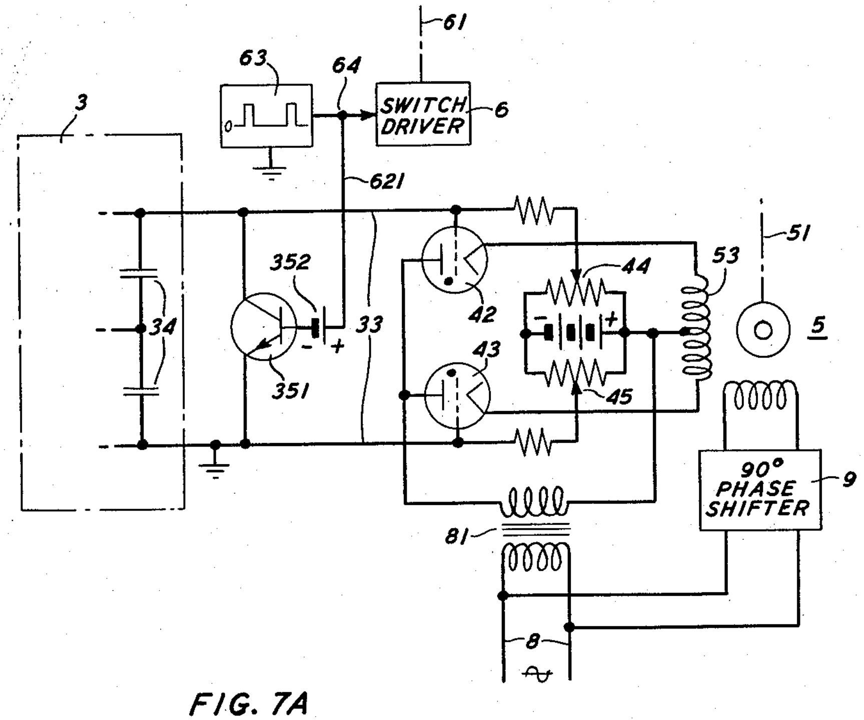
Figure 7A:
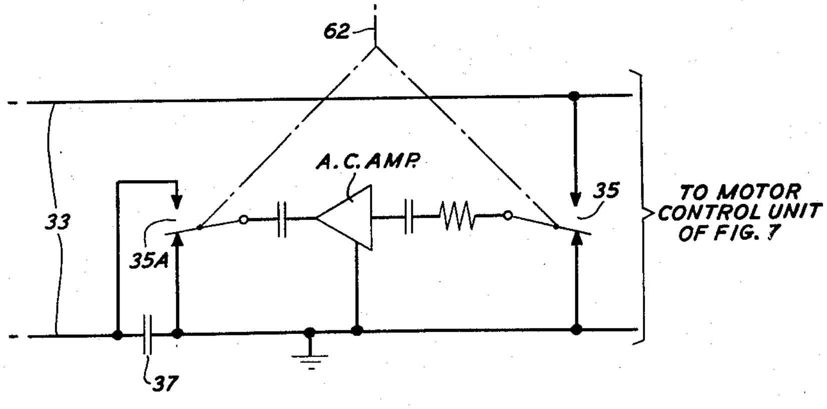

Fig. 5A discloses an alternative motor control circuit for Fig. 5 which includes an auxiliary motor for correcting for any phase drift in the phase discriminator and motor control circuit;

Fig. 6 shows a modification of Fig. 5 employing a different type of motor control;

Fig. 7 discloses a different type of motor control circuit and discriminator clamp means which may be used in connection with the circuits of Fig. 5; and Fig. 7A discloses an alternative electronic drift compensator to correct for drift in the discriminator.

Figure 1:
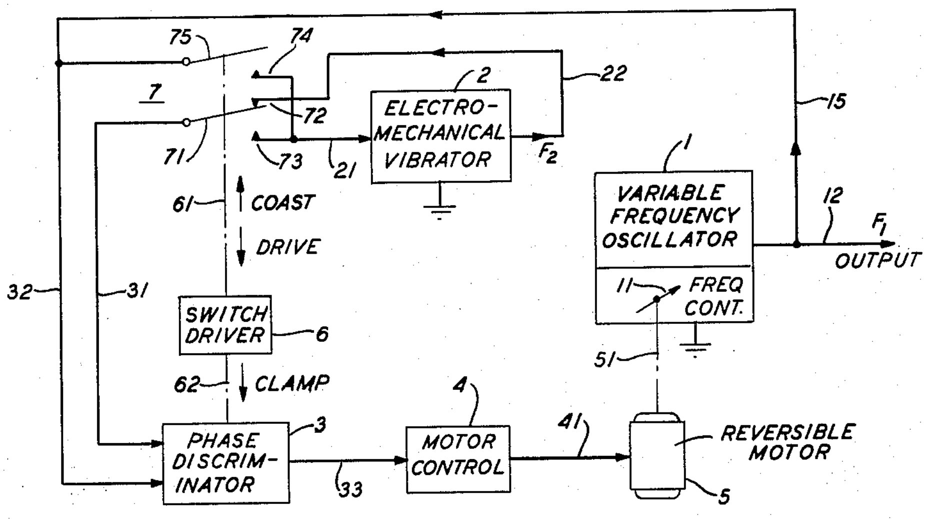

The block diagram of Fig. 1 shows the essential elements of the combination comprising this invention. A variable frequency oscillator 1, having a frequency control means 11, delivers an output of frequency $F_1$ by way of conductor 12. This output is also applied to the input terminal 32 of a phase discriminator 3 by way of conductor 15. Variable frequency oscillator 1 may be of any conventional type having good frequency stability over a short period. Phase discriminator 3 may be of any conventional type having two input circuits 31 and 32 and an output circuit 33.

Figure 3:
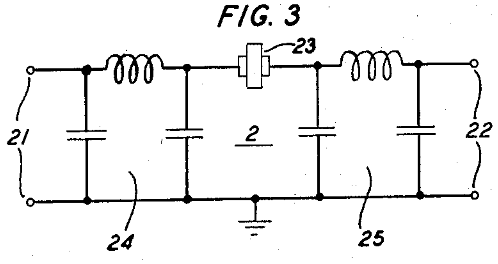
Fig. 3 shows one form of vibrating means.

An electromechanical vibrator 2, having a good long time frequency stability and producing an output frequency $F_2$, may be of any conventional type such as a magnetostrictive vibrator, a vibrating fork or bar or a piezoelectric crystal. It should have a zero phase shift at the operating frequency. Since piezoelectric crystals generally have a good long time stability under carefully controlled temperature conditions, such vibrators are preferred for the present purpose. A conventional piezoelectric crystal network suitable for use as vibrator 2 is shown in in Fig. 3 where it comprises the crystal 23 and two phase shift networks 24 and 25. The entire network has a zero phase shift between its input circuit 21 and its output circuit 22 at the operating frequency.

The variable frequency oscillator 1 is caused to intermittently drive the electromechanical vibrator 2 by way of its input conductor 21, the driving period being relatively short compared to the repetition period. Connections for causing this intermittent drive are provided by a vibrating switch 7 under control of a switch driver 6. Switch 7 is shown in Fig. 1 as having two switch arms 71 and 75 which vibrate between their respective contacts. The driving period is that period during which switch arm 75 engages contact 74 and switch arm 71 engages contact 73, while the coasting period is that period during which switch arm 71 engages contact 72. During the drive period switch 7 connects the output circuit of the oscillator 1 to the input terminal 21 of the vibrator 2, the resulting circuit being completed by way of a path extending from output terminal 12 of oscillator 1 to switch arm 75 by way of conductor 15 and to input terminal 21 of vibrator 2 by way of contact 74. Also during this driving period, it will be noted that the output of oscillator 1 is connected to the input terminal 31 of phase discriminator 3 by way of switch arm 71, contacts 73 and 74 and switch arm 75 so that during the driving period both terminals of the phase discriminator are supplied with the oscillator frequency, $F_1$. During the coasting period of the cycle, these switch arms are in their upper positions so that oscillator 1 is disconnected from the input terminal 21 of vibrator 2 while the vibrator output terminal 22 is connected to input terminal 31 of phase discriminator 3 by way of contact 72 and switch arm 71.

Switch driver 6 also has a connection 62 to phase discriminator 3 which serves the purpose of clamping the output voltage of the discriminator to zero during the driving period.

The frequency control 11 of oscillator 1 is controlled by a reversible motor 5 by way of a mechanical link 51 and this motor is, in turn, controlled from a motor control 4 by way of connection 41. Phase discriminator 3 connects to the motor control 4 over circuit path 33. Thus, when the phase discriminator is delivering an output voltage to circuit path 33, motor control 4 causes reversible motor 5 to correct the frequency $F_1$ of oscillator 1 toward agreement with frequency $F_2$ of vibrator 2.

The operation of Fig. 1 will be more readily understood by a brief description beginning with the assumption that frequencies $F_1$ and $F_2$ are identical and in phase. Switch 7 is shown in the coasting position during which time the vibrator output is applied to the input terminal 31 of the phase discriminator 3 and since, as assumed, its frequency is identical with that of oscillator 1, the phase discriminator will produce no output to circuit path 33. Consequently, the reversible motor 5 will not act to change the frequency of oscillator 1. Now assume that, during the coasting interval, the frequency of oscillator 1 should change so that the input frequencies to phase discriminator 3 at terminals 31 and 32 are no longer exactly in phase. This will cause the phase discriminator to deliver an output voltage to circuit path 33 to cause motor control 4 to drive motor 5 in the proper direction to tend to correct for this shift in frequency.

In order to insure that vibrator 2 will continue vibration at a sufficient amplitude, it must be occasionally driven from the oscillator 1. Remembering that these two frequencies over a period of time will be made to substantially agree, the output voltage from oscillator 1 will be nearly in exact phase with that of vibrator 2 so that when switch 7 moves to its drive position oscillator 1 will impart sufficient energy to vibrator 2 to maintain a suitable amplitude of vibration throughout the succeeding coast period.

Vibrator 2 must be capable of good long time frequency stability. This may be accomplished by many kinds of electromechanical vibrators providing that they are maintained under constant ambient conditions, that they are driven no more than is necessary to maintain a suitable amplitude, and providing that they have good aging properties. As suggested above, it has been discovered that with the piezoelectric crystals vibrating freely at the temperatures specified above, the drift rates can be expected to be in the order of one part in ten billion per month or better. In order to achieve this low drift rate, it is necessary that the crystal be removed from all influences which tend to introduce aging. Also the circuitry connected to the crystal, both at its input and output terminals, should have a minimum influence upon the frequency of the crystal.

Figure 4:
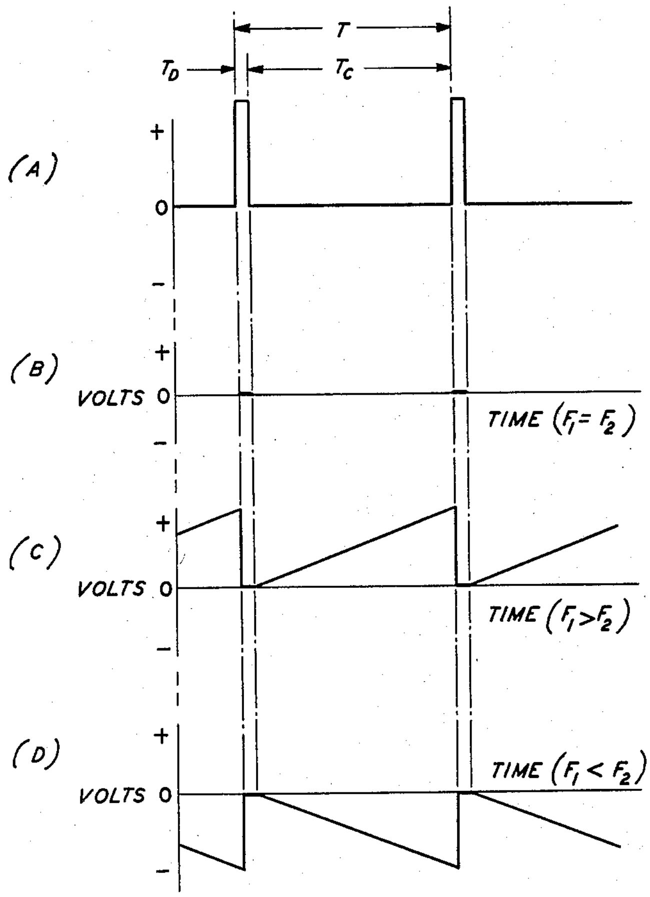
Fig. 4 is a series of graphs showing the output of the switch driver power source and the output characteristics of the discriminator under different relative frequency conditions.

In accordance with this invention, these requirements are met by circuit means which only intermittently drives the crystal over only a small portion of the total vibrator time. The crystal is preferably placed under the ambient conditions mentioned above and is coupled to the driving oscillator for only a very short period after which its output circuit is coupled to the phase discriminator during the period that the crystal is permitted to coast. This will be more readily understood by reference to the diagrams in Fig. 4 where the pulse wave in Fig. 4(A) illustrates a typical driving characteristic provided by the action of switch 7. The total vibrating period of one cycle of switch 7 is represented by the time T while the driving period is represented by the time $T_D$ and the coasting period by the time $T_C$. Although the invention is not limited to any particular intervals, the vibrating period T of switch 7 may be in the order of one second while the driving interval $T_D$ may be in the order of ten milliseconds, thus leaving a coasting interval in the order of nine hundred ninety milliseconds. Thus it will be seen that the crystal receives driving energy only for a short fraction of the entire vibrating period of switch 7. It necessarily follows that the input impedance of the phase discriminator must not load the output circuit of the vibrator 2 to the extent that it lowers the vibrator amplitude below a satisfactory level before the next driving interval. This, of course, is easily accomplished by any good design and should a phase discriminator be employed which, of itself, does not have the proper impedance characteristic, the vibrator and the discriminator may be connected through a buffer amplifier in a well known manner.

The phase discriminator output characteristic under the conditions where the oscillator and vibrator frequencies are equal and in phase are shown in Fig. 4(B). As previously stated, when these frequencies are equal and in phase, the discriminator will produce no output to circuit 33 and hence no corrective action is applied to oscillator 1. This is represented by the zero discriminator output voltage of Fig. 4(B).

Fig. 4(C) shows the condition where the oscillator frequency drifts slightly higher than the frequency of the vibrator. This results in an effective difference in phase existing between these two frequencies so that the phase discriminator builds up an output voltage in a proper direction to cause the motor control and motor to drive the frequency control in oscillator 1 in a direction to correct for this frequency error. As shown in Fig. 4(C), the discriminator output voltage is brought to zero at the beginning of the driving interval $T_D$. This is accomplished by way of the clamp circuit 62 from the switch driver 6. Thus the discriminator output is reset and held to zero during each driving interval. Immediately at the conclusion of the driving interval and at the beginning of the coasting interval, the phase discriminator output voltage builds up because of the difference in phase between the outputs of the vibrator and oscillator. This output voltage causes the motor control and reversible motor to reduce the frequency of oscillator 1. As this correcting action takes place over a period of time, the slope of the phase discriminator output voltage gradually reduces until the conditions shown in Fig. 4(B) are again reached.

The characteristic shown in Fig. 4(D) is the same as shown and described for Fig. 4(C) except that in this instance it is assumed that the frequency of oscillator 1 has drifted to a frequency slightly below that of the vibrator 2. It must be understood that in each instance this frequency drift is actually only a small fraction of a cycle so that the effect is actually one of a slowly changing phase shift.

Figure 2:
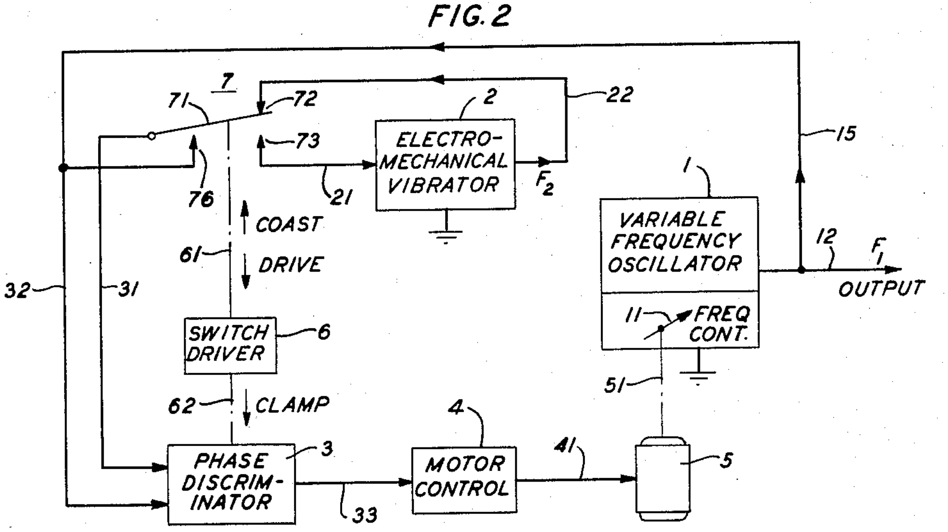

Fig. 2 shows an alternative form of switch providing the same switching function as provided by switch 7 of Fig. 1. In this instance the switch arm 71 is the same as the one shown in Fig. 1 and acts to alternately connect the input terminal 31 of phase discriminator 3 between the input terminal 21 and the output terminal 22 of vibrator 2. This action is the same in both Fig. 1 and in Fig. 2. However, instead of using a separate switch arm 75, as in Fig. 1, an additional contact 76 is provided on the drive side of switch arm 71. In tracing the circuits, it will be observed that precisely the same circuit conditions are established in the two figures. As in Fig. 1, the switch driver 6 of Fig. 2 is also connected to the phase discriminator through coupling 62 to clamp the phase discriminator output voltage to zero during each driving interval.

Fig. 5 shows the invention in greater detail, particularly as to some of the circuit components such as the phase discriminator and motor control. In this figure it is suggested that oscillator 1 may be the same as that shown in U.S. Patent 2,775,699, granted December 25, 1956 to E. P. Felch. The frequency control means 11 shown in Fig. 5 is the variable capacitor $C_A$ shown in the crystal unit in Fig. 1 of the aforementioned patent. As described in that patent, and as is well understood, a change in the capacitance of capacitor 11 will alter the vibrating frequency of the crystal network and thereby change the frequency of the oscillator. In Fig. 5 this control is derived from the motor 5 just as was the case in Fig. 1. It is here specifically illustrated as a two phase motor having phase windings 52 and 53 and a rotor 54, the latter being coupled to frequency control means 11 by way of the mechanical coupling 51. Phase winding 53 is center tapped and only one half of this winding is operative at any one time. Current in one half of this winding causes motor rotation in one direction while current in the other half causes rotation in the opposite direction. In order to provide the necessary 90 degree phase relationship, a suitable phase shifter 9 is provided in the circuit of winding 52. The motor control circuit 4 employs a pair of thyratrons 42 and 43 in a conventional motor control arrangement frequently used in recorders. Bias is supplied to the grids of both tubes through grid resistors and potentiometers 44 and 45 by way of an obvious conventional circuit. Potentiometers 44 and 45 are individually adjusted so that their respective thyratrons 42 and 43 are biased just below their discharge points while their plates are being supplied by an alternating voltage from source 8 by way of the center tap phase winding 53.

The phase discriminator 3 of Fig. 5 is of a conventional type well known in the art. The input voltages to circuits 31 and 32 are in phase but are supplied in quadrature to their respective transformer windings because of phase shifter 36 so that a rectified output voltage is obtained across the discriminator capacitors 34 whenever the two input voltages depart from an exact input phase agreement. Thus, should the frequency of oscillator 1 shift slightly so as to result in a voltage being applied to input conductor 32 which has a phase slightly different from that applied to conductor 31 from the crystal network 2 an output voltage will develop of a given polarity across capacitances 34. The manner in which this is done is well known in the art and requires no further description. This output voltage is applied by way of circuit 33 to the grids of thyratrons 42 and 43 causing one of these grids to become more negative with respect to its cathode and the other one more positive. The one becoming more positive will start conduction during the positive half cycles of the alternating voltage from source 8 thereby permitting conduction through one of the sections of phase winding 53 to cause the motor 5 to rotate in the proper direction to correct for the phase difference.

As described above in connection with Figs. 1 and 2, the switch driver 6 provides a clamping action on the phase discriminator during the drive interval. This is illustrated in Fig. 5 by a mechanical link 62 between the driver 6 and a pair of switch contacts 35 in the phase discriminator. Contacts 35 are thereby synchronized with the switch arms of switch 7 so that they close during the drive interval to discharge capacitors 34 and immediately clamp the output of the discriminator to zero during the drive interval. This prevents the motor 5 from introducing any corrective action during the drive interval and resets the controls to zero. Also in Fig. 5 it will be noted that the switch driver 6 is shown under control of a square wave generator 63 which is coupled to the driver 6 by way of circuit path 64. While these structures may be of any conventional type, source 63 may comprise a direct voltage source which is intermittently switched into the circuit 64 by a cam operated switch driven by a motor and driver 6 may comprise simply the coil of a relay which actuates the arms of switch 7 and contacts 35 through links 61 and 62, respectively. Alternatively, the cam may drive the switch arms directly.

In the description thus far it has been assumed that there is no substantial drift in the phase discriminator circuits 3 so that, once adjusted, the output voltage across circuit 33 should rapidly reduce to zero during the driving interval when input conductors 31 and 32 are connected together to the output circuit of oscillator 1. It is to be understood that under these circumstances the input voltages to input conductors 31 and 32 of the phase discriminator are made identical by reason of their common connection to the same source so that the output voltage at circuit 33 should be zero. Assuming, however, that some drift occurs in the phase discriminator so this output voltage is not zero, it will become apparent that the motor control circuit 4 will cause motor 5 to produce an undesirable frequency change in oscillator 1.

The effect of this drift can be overcome by the arrangement shown in Fig. 5A which modifies Fig. 5 principally in that an additional potentiometer 46 is included in the bias circuit for thyratrons 42 and 43 and an auxiliary motor 5A has its armature 54A coupled to this potentiometer by way of coupling link 51A. The clamping switch 35, shown in Fig. 5 as a shorting switch across circuit 33, is here shown connected into the center tap circuit of motor windings 53 and 53A. Fig. 5A shows switch 35 in the coasting position so that the output from the phase discriminator 3 may operate motor 5 as described above for Fig. 5. However, when switch 7 moves to its drive position, mechanical link 62 brings switch 35 to its lower position to momentarily disable motor 5 and enable the auxiliary motor 5A. In this switch position the two input circuits of discriminator 3 are both connected to the output circuit of oscillator 1 and, if there is no drift in the phase discriminator, the output voltage across circuit 33 will so rapidly reduce to zero that motor 5A will receive no appreciable current in either half of its winding 53A and will thus leave potentiometer 46 unmoved. However, should some drift exist in the discriminator so that a residual drift voltage remains across circuit 33, one of the thyratrons 42 or 43 will discharge and cause motor 5A to move potentiometer 46 in the proper direction to correct for this drift. This correction is in the form of additional bias inserted by potentiometer 46 in the grid circuits of the thyratrons so as to render them inactive in the presence of this drift voltage. For example, assume that the upper conductor of circuit 33 is positive with respect to the lower conductor during the drive interval because of some phase drift having occurred in the discriminator. The effect of this drift voltage is to cause thyratron 42 to discharge and drive motor 5A in such a direction as to lower the brush of potentiometer 46, thus introducing an additional negative bias voltage for the grid of tube 42. Insofar as the grid of tube 43 is concerned, the effect of this potentiometer is merely to reduce the amount of negative bias introduced by the drift voltage so that, when the compensation is complete, the drift voltage occurring across circuit 33 will not cause either thyratron to discharge. During the succeeding coast period when switch 7 is in its upper position, motor 5 is again enabled but will not operate unless oscillator 1 requires correction as compared with the vibrator frequency. An incidental but important advantage of the circuit of Fig. 5A is that it also introduces correction for drift in the operating voltages of tubes 42 and 43 so that motor 5 does not run during the coasting period due to these tube drifts. Motor 5 is thereby fully disabled insofar as all drift effects in the discriminator and control circuits are concerned.

From the above description of Fig. 5A, other equivalent means for effectively clamping, reducing or otherwise compensating for discriminator drift will become evident to those skilled in the art. For example, instead of having motor 5A adjust the potentiometer 46, it may be caused to adjust an element in phase shifter 36 in the discriminator circuit of Fig. 5 in such a direction as to bring the voltage across circuit 33 to zero during the drive intervals. Electronic means may also be used as disclosed in Fig. 7A which shows a chopper amplifier of the type described by Edwin A. Goldberg on page 296 of the R.C.A. Review for June 1950. Here the discriminator drift voltage appears across circuit 33 only during the drive period. Contacts 35 and 35A are synchronized with switch 7 by reason of their connection through link 62 to switch driver 6. Contacts 35 provide the chopper function while contacts 35A provide the rectifier function. During the coasting period these contacts short both the input and the output of the amplifier, it being observed that these contacts are shown down, instead of up, for the coasting period in order to simplify the diagram. During the drive period, contacts 35 sample the discriminator drift voltage as applied to the motor control unit. This voltage is amplified and applied by contacts 35A to charge capacitor 37 in a direction to oppose the drift voltage in circuit 33. Due to the high gain of the amplifier, capacitor 37 quickly charges to a voltage nearly equal to the discriminator drift voltage so that the very small difference applied to the motor control unit and to the amplifier input circuit is too small to permit tubes 42 and 43 to discharge. The discriminator drift voltage is thus rendered incapable of causing rotation of motor 5 during the interval that the crystal is being driven.

Fig. 6 discloses a modification of the motor control circuits of the invention by the employment of motor and control circuits disclosed in U.S. Patent 2,396,187, granted March 5, 1946 to W. J. Means and T. Slonczewski. In Fig. 6, the motor control circuit conductors 13 and 14 correspond with conductors of the same number in the Means-Slonczewski patent and the motor 5 may have one armature M or the two armatures $M_1$ and $M_2$ as shown in Figs. 1 and 2 of the Means-Slonczewski patent. The advantage in using this circuit over the one disclosed in Fig. 5 is that this circuit also embodies an antihunting feature which prevents the motor from overshooting when the crystal and vibrator outputs approach phase coincidence.

The circuits of Fig. 7 are similar to those of Fig. 5 except that an alternative motor control circuit is again shown as well as a substitution of a transistor clamp for the mechanical switch contacts 35 of Fig. 5. In this figure, circuit 33, and hence capacitors 34, are bridged by the emitter-collector path of a transistor 351 which acts as a switch performing the same function as switch 35 in Fig. 5. The base of this transistor is connected through a small biasing source 352 by way of conductor 621 to the output circuit 64 of driving source 63. Each time the switch driver 6 receives a positive voltage pulse to cause it to move into its drive position, this pulse is also applied to the base of transistor 351 to provide a low impedance between the collector and emitter, thereby clamping the discriminator output voltage to zero.

The motor control circuit portion of Fig. 7 is somewhat similar to that shown in Fig. 5 except that the thyratrons are reversed so that their cathodes are connected to the phase winding 53 and their anodes are connected to source 8 through an isolating transformer 81, the purpose of which is to permit grounding one side of the discriminator. The operation of this circuit is otherwise identical to that described for the motor control circuit of Fig. 5.

While various arrangements have been disclosed for the purpose of illustrating this invention, it must be understood that they are illustrative only and should not be regarded as restrictive. Various kinds of well-known structures may be substituted for many of the components specifically disclosed. For example, most any phase discriminator may be employed, and if it does not have a satisfactory input impedance, at least for circuit 31 which is connected to the output circuit of vibrator 2, it may be coupled by way of a suitable buffer amplifier as previously mentioned. Also, any kind of reversible motor drive responsive to the output of the phase discriminator may be employed and many such devices are well known in the motor control art. Alternatively, as is also well known, the phase discriminator may control a polarized relay which causes reverse operation of a motor circuit. Again, while a well-constructed crystal oscillator is preferred for oscillator 1, it need not be crystal controlled so long as it is well constructed and has a reasonably good short time stability so that its frequency does not drift excessively from the vibrator frequency during the coasting interval. It is obvious that if its short time stability is too poor it will drift out of control during the coasting interval. The requirements for the electromechanical vibrator 2 are that it shall be capable of being driven from the oscillator, it shall produce an electrical output during the coasting interval, it shall insert no phase shift, and it must have good frequency stability over long periods of time. This latter requirement is quite readily met by employing high "Q" vibrating devices operating under closely regulated ambient conditions and by employing minimum coupling between this device and its driving and output circuits. In accordance with this invention, this minimum coupling is greatly enhanced by intermittently driving the crystal during short periods and permitting relatively long intervening coasting periods.

What is claimed is:

1. A constant frequency source comprising an oscillator having a variable frequency control means, means for adjusting said frequency control means, a constant frequency electromechanical vibrator, means for intermittently connecting said oscillator to said vibrator to impart energy to said vibrator during each connecting period, the vibrator coasting freely during the periods between successive connecting periods, means for comparing the frequencies of said oscillator and said vibrator during the coasting periods, and means responsive to said comparing means for controlling said adjusting means to reduce any frequency difference between said oscillator and said vibrator.

2. The combination of claim 1 wherein said vibrator is a piezoelectric crystal.

3. The combination of claim 1 wherein said means for comparing the frequencies is a phase discriminator having an output terminal connected to said frequency adjusting means, one input terminal connected to said oscillator, and a second input terminal alternately connected first to said oscillator during said connecting period and then to said vibrator during said coasting period.

4. The combination of claim 3 wherein said discriminator includes means under control of said intermittent connecting means for reducing the output of said discriminator to zero during said connecting periods when said vibrator is receiving energy from said oscillator.

5. A constant frequency source comprising an oscillator having a variable frequency control means and an output circuit, means for adjusting said frequency control means, a phase discriminator having two input circuits and an output circuit, means connecting said discriminator output circuit to said adjusting means to control it in response to the phase difference between voltages at said two input circuits, a constant frequency electromechanical vibrating means having input and output terminals, means connecting said oscillator output circuit to one of said discriminator input circuits, and a switching means for alternately connecting said other discriminator input circuit first to both said oscillator output circuit and said vibrating means input terminal and then to said vibrating means output terminal.

6. The combination of claim 5 wherein said switching means includes means for reducing the output voltage of said discriminator to zero during the period that the oscillator output circuit is connected to the vibrating means input terminal.

7. A constant frequency source comprising an oscillator having a variable frequency control means and an output circuit, means for adjusting said frequency control means, a phase discriminator having two input circuits and an output circuit, means connecting said discriminator output circuit to said adjusting means to control it in response to the phase difference between voltages at said two input circuits, a constant frequency electromechanical vibrating means having input and output terminals, means connecting said oscillator output circuit to one of said discriminator input circuits, and a two-state switching means alternately operating between its two states, said switching means during its first state connecting the oscillator output circuit to both the other of said discriminator input circuits and said vibrating means input terminal and during the second state opening the input terminal of said vibrator means and transferring said other discriminator input circuit to said vibrator means output terminal.

8. The combination of claim 7 wherein said switching means includes means for reducing the discriminator output to zero during the period said switching means is in its first named state.

9. The combination of claim 7 wherein said vibrating means is a piezoelectric crystal.

10. A constant frequency source comprising a crystal controlled oscillator having a frequency trimmer and an output circuit, a motor means coupled to said trimmer, a phase detector having two input circuits and an output circuit, said output circuit being connected to said motor means to control it in response to the phase difference between voltages at said two input circuits, a constant frequency electromechanical vibrating means having input and output terminals, means connecting said oscillator output circuit to one of said phase detector input circuits, and a switching means for alternately connecting said other phase detector input circuit first to both said oscillator output circuit and said vibrating means input terminal and then to said vibrating means output terminal.

11. The combination of claim 10 wherein said phase detector output circuit includes means for disabling said motor means in the presence of any drift effect in the path between said detector and said motor means.

References Cited in the file of this patent

UNITED STATES PATENTS 2,077,314 Eberhard et al. ---------- Apr. 13, 1937